Patented Aug. 16, 1932                                         1,872,568

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

OXIDIZED RESINOUS PRODUCT AND PROCESS OF MAKING SAME

No Drawing.          Application filed December 6, 1927. Serial No. 238,233.

This invention relates to synthetic resins and particularly to oxidized resins and is concerned in an illustrative way with resins prepared by reacting on organic acids with polyhydric alcohols and other resinifying substances resulting in oxidized products of increased melting point and in some cases of improved solubility.

Without setting forth at length the various types of resins which may be produced in accordance with the present invention, I may state that these, in general in the preferred form, are those disclosed in my copending applications.

The synthetic resins that may be treated in accordance with the present invention are of wide variety. For example resins of the polyhydric alcohol organic acid type may be utilized. The polyhydric alcohol ingredient may be glycerol, the glycols, such as ethylene and propylene glycols, polyglycerol, and many other polyhydric alcohols or their derivatives which are reactive in such instances. The organic acids include phthalic acid, salicylic, benzoic, citric, tartaric, lactic, malic, mucic, camphoric, and other monobasic, dibasic and tribasic acids. Various mixtures of the polyhydric alcohol ingredients or their equivalents and the organic acids may be utilized. Furthermore, the reaction complexes may be modified by the inclusion of various types of other derivatives. Fatty oils and fatty oil acids particularly those of the drying oils, but also including the semi-drying oils may be utilized. For example, linseed oil acids, soya bean oil containing free fatty acids, cocoanut oil containing free fatty acids, or the fatty acids themselves, blown and hydrogenated oils, and oil acids, castor oil, cottonseed oil, etc. may be utilized in the production of these resins, and the inclusion of such added oils or acids in the molecule particularly modifies the characteristics of the reaction complex. Natural resins, such as rosin, Congo, damar, etc., may be included in the reaction complexes and further tend to modify the properties of such complexes. The reactions may be carried out in the presence of reaction modifiers, either of acid or alkalin character. The basic type of reaction modifiers may include calcium oxide or hydrates, barium hydrate, magnesium oxide, zinc oxide, etc. These materials may be present during the initial stages of the reaction, or they may be included subsequently to modify the acid number of the reaction complex. Organic bases such as aniline, diphenylamine, etc. may also be utilized. Urea and related materials also served to orient the reaction, or to reduce the acidity of final products. Instead of using the oils or oil acids as ingredients of the resins, the oils may be subjected to activation, so that they are rendered more readily susceptible of resinification as by heating the oils with glycerol or related materials, mixtures containing mono and diglycerides are secured, which may then be utilized for resinification as with organic acids, such as are set forth above, particularly phthalic acid and related ingredients, and additional quantities of polyhydric alcohol when such are desired. The fatty oils or fatty oil acids may be subjected to heat treatment, such as distillation, prior to their utilization in the resinification reactions. The above examples are illustrative of the wide variety of resins that may be utilized in connection with the present invention.

As an illustration a resin was prepared in the following manner:

Rosin_____ 81 lbs. 6 ozs.
Glycerol_____ 21 lbs.
Phthalic anhydride_____ 18 lbs. 12 ozs.

These raw materials were heated in an aluminum kettle, raising the temperature gradually over several hours until finally the maximum temperature of 540° F. was reached. The heating then was stopped and the resin allowed to cool to 300° F. and then poured from the kettle.

The softening point of this resin was 194° F.

The oxidation was carried out by pulverizing the resin and exposing it in a shallow layer in an oven through which air was circulating, to a temperature slightly below the melting point of the resin. Preferably a temperature is used which does not cause the powdered resin to frit together to form solid impenetrable masses.

The temperature of the oven was initially 122° F. On the 4th day of the heating the softening point had increased to 210° F. and the temperature was then raised to 140° F. After two days additional heating at this temperature the softening point was found to be 220° F.

This increase in melting point renders the product more valuable in the production of hard lacquer coatings, and the like. Thus, I may employ such an oxidized rosin phthalic glyceride complex in making nitrocellulose lacquers, cellulose acetate lacquers and for other purposes.

In like manner other resinous complexes such as rosin Congo phthalic glyceride resin; or rosin or other natural acid resins reacted on with succinic, benzoic, malic, maleic, or other acids, together with glycerol or glycol, or glycol ethers, and the like, may be similarly oxidized.

Whether the resin in question is wholly synthetic, or whether made with the aid of a natural resin, I may apply the oxidation treatment to secure an increased melting point, while restraining the oxidation from progressing to the point where insolubility occurs, as is likely to happen with certain of the synthetic resins, unless the oxidation is stopped within the range of appropriate solubility.

The rosin phthalic glyceride resin is not easily oxidized to an insoluble product, but rather tends to become more soluble in certain lacquer solvents. Having in mind primarily the object of rendering resins harder for use in coating compositions, I nevertheless restrain the heating and oxidation to a degree consistent with solubility requirements.

While I prefer to carry out the oxidation in the manner set forth, I do not wish to preclude myself from oxidizing by means of air-blowing, and the like, with or without lead manganese or other catalytic substances. Also, when oxidizing in the powdered form, I may have present in the initial resin some appropriate catalytic substance such as lead resinate, and the like.

It will be noted from the foregoing illustration that the melting point of the rosin phthalic glyceride resin is materially increased by the oxidation treatment. The resulting resin therefore is more valuable for many purposes than the original resin of low melting point.

The present procedure does not embrace the oxidation of ordinary rosin ester or so-called ester gum, but is concerned with resins which are prepared synthetically and which, if desired, may contain variable proportions of natural resins, either wholly or partially in combination with the synthetic portion of the complex.

This invention embraces the process of making an oxidized complex of increased melting point, as well as the product of such oxidation. In the preferred form this embraces an oxidized complex containing a natural resin and synthetic resin material, the latter component being preferably of the organic acid polyhydric type.

What I claim is:—

1. An oxidized, rosin phthalic glyceride resin.

2. An oxidized complex containing rosin and synthetic resinous material.

3. An oxidized complex containing a natural resin and a synthetic resinous material.

4. The process of increasing the melting point of resinous material containing a synthetic resin component, which comprises exposing the pulverized material to the action of air at a temperature below the fritting point and continuing such exposure until the melting point thereof is substantially increased.

5. An oxidized organic acid-polyhydric alcohol resin.

6. An oxidized natural resin—organic acid—polybasic alcohol complex.

7. A soluble oxidized product containing a synthetic glyceride resin.

8. The process of increasing the melting point of resinous material containing a synthetic resin component which comprises exposing the material in powdered condition to the action of a gas containing oxygen at a temperature below the fritting point of the resin particles.

9. A process as set forth in claim 4, wherein the temperature of treatment is increased as the melting point of the product increases.

10. A process as set forth in claim 4, in which the oxidation treatment is carried out in the presence of an oxidation catalyst.

11. An oxidized synthetic polyhydric alcohol-polybasic organic acid resin having a melting point higher than that of the unoxidized resin produced from the same ingredients.

12. An oxidized synthetic polyhydric alcohol, monobasic organic carboxylic acid, polybasic organic carboxylic acid resin having a melting point higher than that of the unoxidized resin produced from the same ingredients.

13. An oxidized synthetic polyhydric alcohol, monobasic organic carboxylic acid, polybasic organic carboxylic acid resin.

14. An oxidized synthetic polyhydric alcohol organic polybasic carboxylic acid resin containing a constituent selected from the group consisting of glyceride oils and glyceride oil acids.

15. An oxidized synthetic polyhydric alcohol organic polybasic carboxylic acid resin containing a constituent selected from the group consisting of drying oils and drying oil acids.

16. An oxidized synthetic polyhydric alcohol organic polybasic carboxylic acid drying oil acid resin.

CARLETON ELLIS.